(12) United States Patent
Raszkowski

(10) Patent No.: US 7,059,461 B2
(45) Date of Patent: Jun. 13, 2006

(54) TORQUE-TRANSMITTING APPARATUS

(75) Inventor: James A. Raszkowski, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 70 days.

(21) Appl. No.: 10/912,618

(22) Filed: Aug. 5, 2004

(65) Prior Publication Data
US 2006/0027435 A1 Feb. 9, 2006

(51) Int. Cl.
*F16D 13/52* (2006.01)
(52) U.S. Cl. ............................. 192/85 AA; 192/70.2; 192/109 R
(58) Field of Classification Search ............ 192/70.16, 192/70.2, 109 R, 85 AA
See application file for complete search history.

(56) References Cited

U.S. PATENT DOCUMENTS

| 5,267,807 | A | * | 12/1993 | Biedermann et al. | ....... 403/375 |
| 5,355,984 | A | * | 10/1994 | Grabis | ...................... 192/70.17 |
| 6,193,042 | B1 | * | 2/2001 | Kempf et al. | ........... 192/85 AA |
| 2003/0188950 | A1 | * | 10/2003 | Kinoshita et al. | ....... 192/109 R |
| 2004/0168878 | A1 | * | 9/2004 | Yabe et al. | ............. 192/85 AA |

FOREIGN PATENT DOCUMENTS

FR 2570147 A2 * 3/1986

* cited by examiner

*Primary Examiner*—Saul Rodriguez
(74) *Attorney, Agent, or Firm*—Christopher DeVries

(57) ABSTRACT

A torque-transmitting mechanism has a plurality of friction plates, which are forced into engagement by a fluid-operated piston and reacted in engagement by a backing plate. The backing plate is assembled on a rotatable shaft to be aligned with splines on the shaft to prevent axial removal of the backing plate without rotation thereof which is restricted due to a spline engagement between the backing plate and the shaft.

3 Claims, 2 Drawing Sheets

TORQUE-TRANSMITTING APPARATUS

TECHNICAL FIELD

This invention relates to torque transmitting apparatus and, more particularly, to rotating-type torque-transmitting mechanisms, such as clutches.

BACKGROUND OF THE INVENTION

Torque-transmitting mechanisms, such as fluid-operated friction clutches, employ a rotating shaft and a rotatable housing, which are interconnected by a plurality of friction discs. The friction discs are generally referred to as a clutch pack and are brought into frictional engagement by a fluid-operated piston and are reacted against a reaction or backing plate, which is generally connected with the rotating shaft.

The backing plate is retained on the shaft by a locking ring, such as either a spiral type locking ring or a C-type locking ring. The locking ring is subjected to centrifugal forces during rotation of the torque-transmitting mechanism and is especially critical to such rotating forces when the torque-transmitting mechanism is disengaged. The use of a locking ring can result in high load applications at the locking ring and spline interface, which reduces the backing plate section size at this loading area. Uneven loading can also occur from the retaining ring gap when a snap ring or C-ring is employed. The retaining ring or locking ring also requires that small fillet radii be present in the groove on the shaft on which the locking ring is positioned.

SUMMARY OF THE INVENTION

It is an object of the present invention to provide an improved torque-transmitting mechanism having a backing plate, which is retained on a shaft by the shaft splines themselves.

In one aspect of the present invention, the torque-transmitting mechanism includes a fluid-operated piston, a plurality of friction discs, and a backing plate.

In another aspect of the present invention, the friction discs are alternatively splined between a shaft and a housing and the backing plate is splined to the shaft.

In yet another aspect of the present invention, the backing plate is installed on the shaft and positioned within a groove after which it is rotated and forced by a wave spring to engage the splines on the shaft.

In still another aspect of the present invention, the backing plate has an annular recess adjacent the spline area in which the wave spring is positioned after assembly of the backing plate on the shaft.

DESCRIPTION OF AN EXEMPLARY EMBODIMENT

Figure 1:
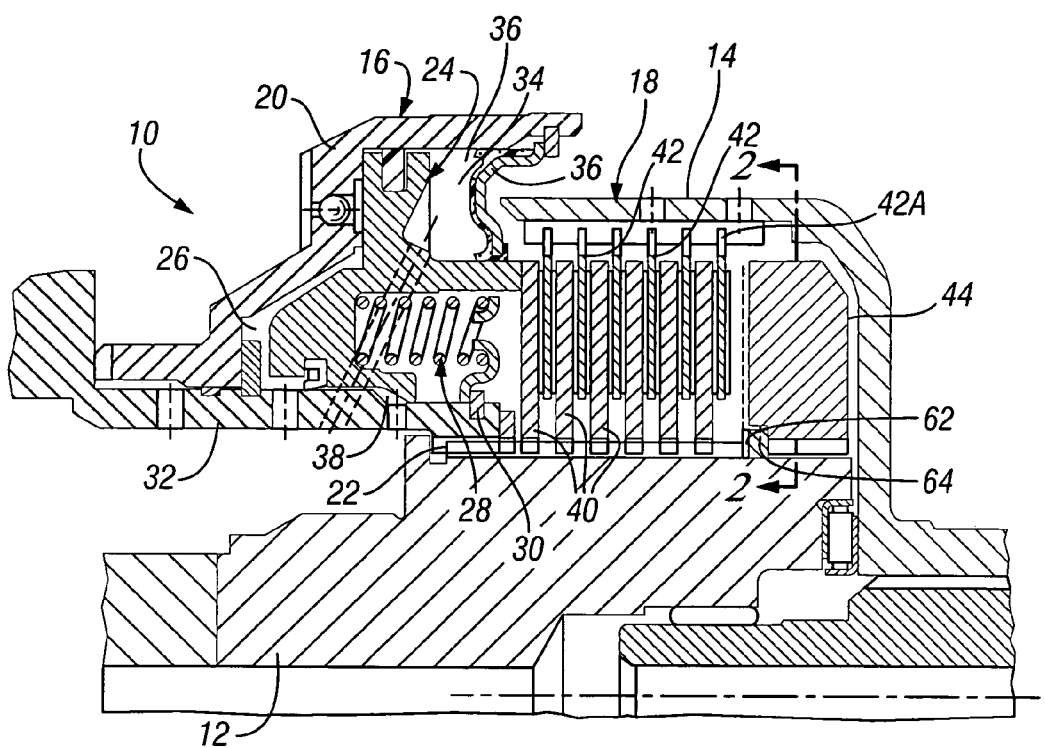
FIG. 1 is a cross-sectional elevational view of a torque-transmitting mechanism incorporating the present invention.

Referring to the drawings, wherein like characters represent the same or corresponding parts throughout the several views, there is seen in FIG. 1 a torque-transmitting mechanism or clutch 10. The torque-transmitting mechanism 10 includes an input shaft 12, an output hub 14, an apply piston assembly 16, and a clutch pack 18.

The piston assembly 16 includes a rotatable housing 20 drivingly connected through a spline connection 22 with the shaft 12, a piston member 24 slidably disposed in a chamber 26 formed between the piston 24 and the housing 20. A return spring pack 28 is compressed between a locking ring 30 disposed on a rotatable member 32, secured to housing 20, and the piston 24. A centrifugal balance chamber 34 is formed between a dam 36 and a portion of the piston 24. The centrifugal balance chamber 34 receives fluid from a lubrication pocket 38 disposed inwardly of the piston 24.

The clutch pack 18 includes a plurality of flat plates 40 interdigitated with a plurality of friction plates 42. The flat plates 40 are splined to the input shaft 12 and the friction plates 42 are splined to the hub 14. Intermediate the hub 14 and one of the friction plates 42A is a backing plate 44. The backing plate 44 is limited in rightward movement on the shaft 12 to provide a reaction surface for the clutch pack 18 when the piston 24 is applied. The piston 24 is fluid-operated by admitting pressurized fluid to the chamber 26, which results in rightward movement of the piston 24 to enforce frictional engagement between the flat plates 40 and the friction plates 42. The backing plate 44 provides a reaction surface for the clutch pack 18 during this engagement operation.

Figure 2:
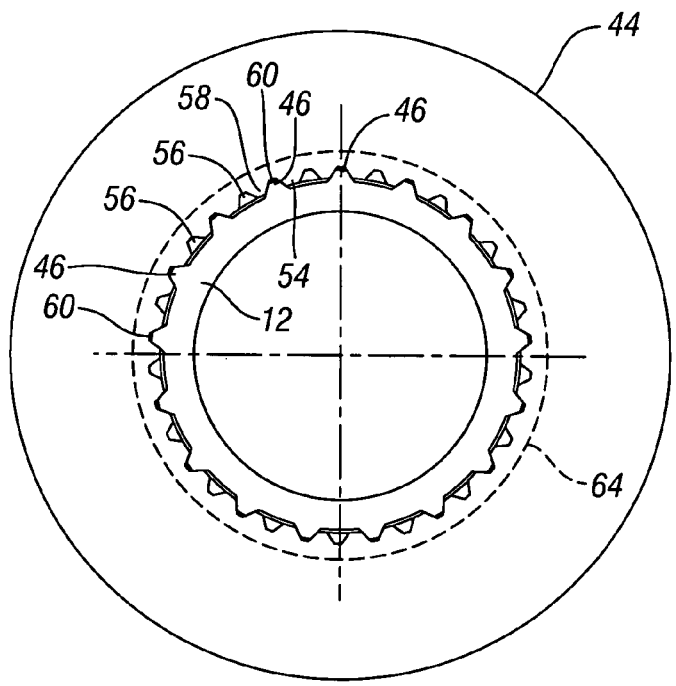
FIG. 2 is a view taken along line 2—2 of FIG. 1.
Figure 4:
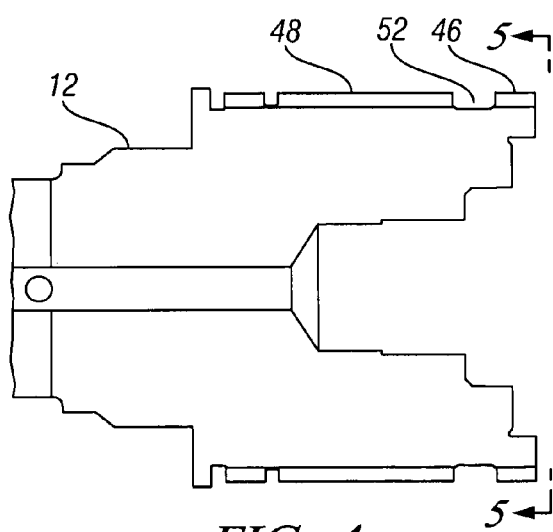
FIG. 4 is a view of the shaft on which the torque-transmitting mechanism is assembled.
Figure 5:
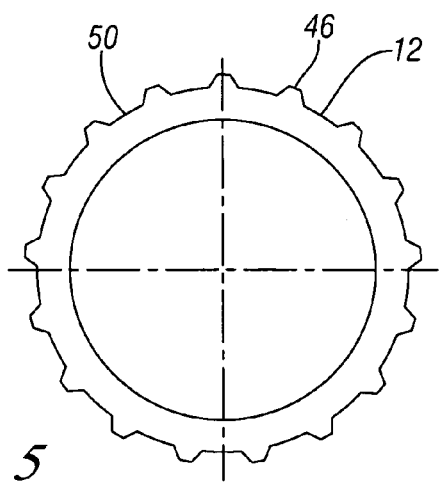
FIG. 5 is a view taken along line 5—5 of FIG. 4.

As seen in FIG. 2, the backing plate 44 is assembled on the shaft 12 and is connected therewith through a plurality of spline teeth 46. As seen in FIGS. 4 and 5, the spline teeth 46 are spaced about the shaft 12. The shaft 12 also has a complement of spline teeth 48, which is equal in number to twice the number of spline teeth 46 on the shaft 12. As can be seen in FIG. 5, a wide space 50 separates each of the spline teeth 46. On the remainder of the shaft 12, the space 50 is filled with another spline member and two spline spaces. As also seen in FIG. 4, a gap or annular opening 52 is formed between the spline complement 48 and the spline teeth 46.

Figure 3:
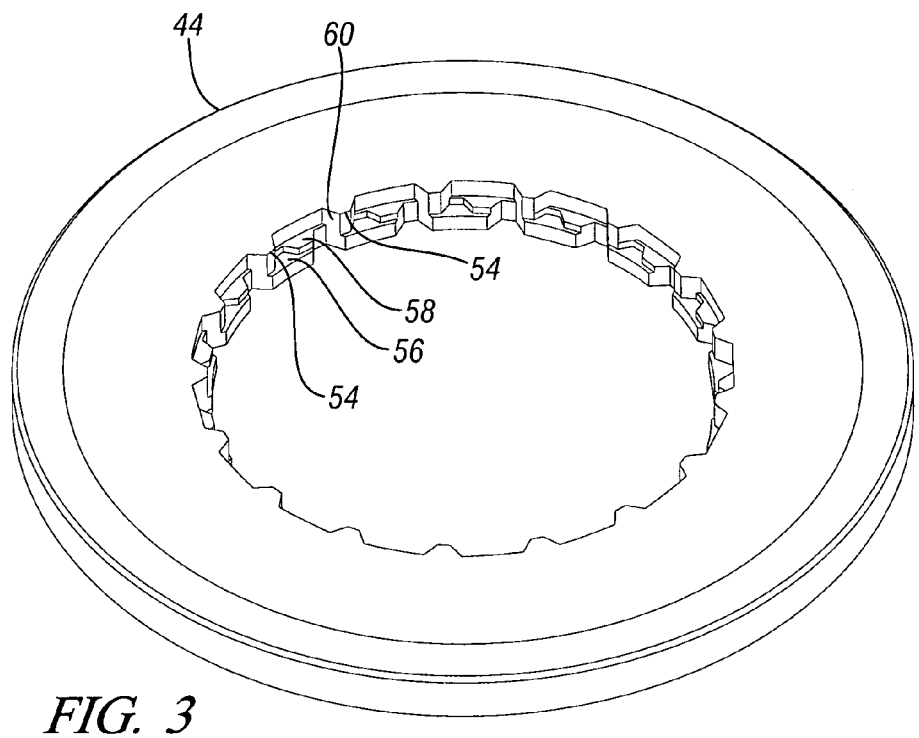
FIG. 3 is an isometric drawing of a backing plate incorporated in the present invention.

The backing plate 44 has a complement of spline teeth 54 formed thereon. Each of the spline teeth 54 is spaced the amount equal to the space 50. Intermediate the spline teeth 54 as seen in FIG. 3, is a pair of partial spline teeth 56 and 58 and a tooth space 60. The backing plate 44 has a width slightly less than the width of the gap or annular opening 52. The backing plate 44 is assembled onto the shaft 12 by aligning the spaces 60 with the spline teeth 46. The backing plate 44 is then moved leftward along the shaft 12 until the opening 52 is encountered at which time the backing plate 44 is rotated either counterclockwise or clockwise, depending on the direction of shaft rotation and contact stresses, until the spline teeth 54 are in meshed alignment with the spline teeth 46 and the spline tooth 56 is aligned for abutment with the spline teeth 46 while the spline tooth 58 is aligned for operation adjacent spline teeth 46.

A wave spring or washer 62 is disposed in the gap 52. During assembly of the backing plate 44, the wave spring 62 is compressed with very light load to permit the assembly of the plate 44. Following the assembly of the plate 44 and the rotation and release thereof, the wave spring 62 is disposed within an annular groove 64 formed on the backing plate 44. During rotation of the torque-transmitting mechanism 10 or the shaft 12, the centrifugal forces on the wave spring 62 are resisted by the groove in the backing plate 64. The wave spring 62 has sufficient energy stored to maintain the engagement of the spline 56 against the end of the respective spline teeth 46 while maintaining the spline teeth 54 in a position adjacent the spline teeth 46 and also maintaining the spline teeth 58 adjacent the subsequent teeth of spline teeth 46.

Once assembled, the axial loads imposed on the backing plate 44 are absorbed through the spline teeth 46 such that a locking ring groove for retaining the backing plate 44 in position is not required, thereby improving the strength and durability of the torque-transmitting assembly. The backing plate 44 requires less axial width than might be necessary with a locking ring feature. Also, the shaft 12 requires less length in the spline area than would otherwise be required when a conventional locking ring retention system is employed. Thus, the invention saves assembly length in the torque-transmitting mechanism.

The invention claimed is:

1. A torque-transmitting mechanism comprising:
   a plurality of friction plates;
   a fluid-operated apply piston;
   a backing plate;
   a rotatable shaft on which said backing plate is assembled, said shaft having a first complement of splines and a second complement of splines having less spline teeth than said first complement of splines, said first and second complements of spline teeth being axially spaced with a recess therebetween, said backing plate having a complement of full length spline teeth equal in number to said second complement of spline teeth and having shortened spline teeth in spaces formed between adjacent said full length spline teeth on said backing plate, said shortened spline teeth engaging an axial end of said second complement of splint teeth during assembly and operation of said torque-transmitting mechanism; and
   means for retaining said backing plate on said rotatable shaft.

2. The torque transmission mechanism defined in claim 1 further comprising:
   said means for retaining including a spring.

3. A torque-transmitting mechanism comprising:
   a plurality of friction plates;
   a fluid-operated apply piston;
   a backing plate;
   a rotatable shaft on which said backing plate is assembled, said shaft having a first complement of spline teeth and a second complement of spline teeth having less spline teeth than said first complement of spline teeth, said backing plate having a complement of full length spline teeth equal in number to said second complement of spline teeth and having shortened spline teeth in spaces formed between adjacent respective ones of said full length spline teeth on said backing plate, said shortened spline teeth engaging an axial end of said second complement of splint teeth during assembly and operation of said torque transmitting mechanism; and
   means including a groove on said backing plate, an annular gap on said shaft and a spring disposed in said groove and said annular gap for retaining said backing plate on said rotatable shaft.

* * * * *